United States Patent [19]

Young

[11] Patent Number: 4,669,543
[45] Date of Patent: Jun. 2, 1987

[54] METHODS AND COMPOSITIONS FOR CONSOLIDATING SOLIDS IN SUBTERRANEAN ZONES

[75] Inventor: Bill M. Young, Duncan, Okla.

[73] Assignee: Halliburton Company, Duncan, Okla.

[21] Appl. No.: 867,363

[22] Filed: May 23, 1986

[51] Int. Cl.$^4$ .......................................... F21B 33/138
[52] U.S. Cl. .................... 166/276; 166/295; 166/292
[58] Field of Search .................. 252/8.55 R; 523/130; 166/276, 278, 280, 295, 292

[56] References Cited

U.S. PATENT DOCUMENTS

| | | | |
|---|---|---|---|
| 3,123,137 | 3/1964 | Young et al. | 166/33 |
| 3,254,717 | 6/1966 | Huitt et al. | 166/42 |
| 3,335,796 | 8/1967 | Parker | 166/12 |
| 3,437,145 | 4/1969 | Johnson et al. | 166/295 |
| 3,757,862 | 9/1973 | Kern et al. | 166/280 |
| 3,919,104 | 11/1975 | Hess | 166/295 X |
| 4,016,931 | 4/1977 | Cryar, Jr. | 166/295 |
| 4,073,342 | 2/1978 | Harnsberger | 166/295 |
| 4,120,842 | 10/1978 | Harnsberger | 260/33.6 |
| 4,336,842 | 6/1982 | Graham et al. | 166/276 |
| 4,427,069 | 1/1984 | Friedman | 166/295 |
| 4,428,427 | 1/1984 | Friedman | 166/278 |
| 4,439,348 | 3/1984 | Akerberg | 252/426 |

Primary Examiner—Stephen J. Novosad
Assistant Examiner—Thomas J. Odar
Attorney, Agent, or Firm—Clark Dougherty; Robert A. Kent

[57] ABSTRACT

Methods and compositions are provided for consolidating solids, either existing or placed in subterranean zones. The solids are contacted with a low viscosity aqueous carrier fluid having an acid curable resin dispersed therein and a delayed acting acid catalyst dissolved therein. The delayed acting catalyst is comprised of the reaction product of an acid and an alkali metal or ammonium molybdate.

17 Claims, No Drawings

METHODS AND COMPOSITIONS FOR CONSOLIDATING SOLIDS IN SUBTERRANEAN ZONES

BACKGROUND OF THE INVENTION

1. Field of the Invention

This invention relates generally to methods and compositions for consolidating solids, and more particularly, to improved methods and compositions for consolidating existing or placed solids in subterranean zones penetrated by well bores.

2. Description of the Prior Art

Various sand consolidation and gravel packing methods and techniques have been developed and employed heretofore for preventing or inhibiting the migration of loose sands and the like with fluids produced from subterranean formations. A particularly successful method of achieving control of such solids involves placing a hardenable consolidating fluid into a subterranean formation whereby the consolidating fluid coats solids existing therein or placed in the formation with the consolidating fluid, and thereafter, causing the consolidating fluid to harden whereby the solids are consolidated into a hard permeable mass. The hard permeable mass allows fluids to be produced from the subterranean formation, but loose sands and the like are prevented from migrating with the produced fluids.

Gravel packing methods and techniques utilized heretofore have generally included placing a solids consolidating fluid and solids coated therewith into a subterranean zone using a thickened aqueous or hydrocarbon base carrier fluid of relatively high viscosity. While such high viscosity carrier fluids can carry high concentrations of solids therewith, they suffer from the disadvantage that rapid dissipation of the carrier fluids into surrounding formations does not occur during the placement of solids. This often results in voids being formed in the solids pack produced. In addition, such high viscosity carrier fluids can cause damage to the permeability of formations into which they are caused to flow. Thus, in gravel packing and other similar procedures employed in subterranean zones, there is a need for a method whereby a carrier fluid of low viscosity can be utilized to place consolidating fluid coated solids into the zones. The low viscosity carrier fluid will rapidly be lost to formations surrounding the zones resulting in the packing of solids at greater velocities and high solids-low carrier fluid masses being produced in the pack zones.

Other disadvantages of carrying out subterranean zone treatments using thickened carrier fluids such as aqueous gels is that such thickened fluids usually require considerable surface preparation equipment and mixing time and often significantly lose viscosity by heat and shear as the fluids are pumped through the well bore into a subterranean zone. The loss in viscosity can and often does result in improper placement of solids and/or other undesirable results.

Consolidating methods utilized heretofore for consolidating solids existing in or placed into subterranean zones have heretofore required several steps to carry out. For example, methods for placing and consolidating solids in subterranean zones have often involved the steps of first placing consolidating fluid-coated solids in the zones followed by contacting the coated solids with overflush fluids containing catalyst. Further, the consolidating fluids heretofore utilized have been difficult to use at low temperatures, e.g., at temperatures less than about 100° F. That is, when the zone in which the consolidating fluid is utilized has a temperature such that the temperature of the consolidating fluid is below about 100° F., long cure times of the consolidating fluid and the use of high quantities of catalyst are often involved. Thus, there is a need for a consolidating fluid-low viscosity carrier fluid composition and method of using such composition whereby the consolidating fluid-carrier fluid composition, the solids to be placed and consolidated thereby and the catalyst used can be combined on-the-fly if desired; whereby solids can be efficiently consolidated at temperatures below about 100° F.; and whereby because of the low viscosity of the carrier fluid and resultant rapid dissipation thereof into subterranean formations, minimum damage to the formations occurs and the occurrence of unpacked regions in gravel packs produced is minimized. The term "on-the-fly" is used herein to mean continuous mixing of components as the resulting mixture is pumped into a well bore and subterranean zone penetrated thereby. By the present invention, methods and compositions for consolidating existing or placed solids in subterranean zones meeting the needs recited above are provided.

SUMMARY OF THE INVENTION

Methods of consolidating solids in a subterranean zone are provided whereby the solids are contacted with a low viscosity aqueous fluid having a consolidating fluid comprised of an acid curable resin dispersed therein and a delayed acting acid catalyst for said consolidating fluid dissolved therein. The solids are coated by the consolidating fluid, the consolidating fluid is catalyzed by the catalyst and the solids are consolidated into a hard permeable mass. The delayed acting catalyst allows the aqueous fluid to be pumped into the subterranean zone prior to when the consolidating fluid is catalyzed thereby and is comprised of the reaction product of an acid and an alkali metal or ammonium molybdate.

Aqueous solids carrier and consolidating compositions are also provided comprised of a low viscosity aqueous liquid, an additive diluted acid curable resin consolidating fluid dispersed in said aqueous liquid and a delayed acting consolidating fluid catalyst consisting of the reaction product of an acid and an alkali metal or ammonium molybdate.

DESCRIPTION OF PREFERRED EMBODIMENTS

In accordance with the present invention, methods of consolidating solids in subterranean zones are provided. The methods include the consolidation of solids existing in subterranean zones as well as solids placed in the zones. The solids are contacted with a low viscosity aqueous carrier fluid having a consolidating fluid comprised of an acid curable resin dispersed therein and a delayed acting acid catalyst for the consolidating fluid dissolved therein. The solids are coated with the consolidating fluid, the consolidating fluid is catalyzed by the catalyst whereby it hardens and the solids are consolidated into a hard permeable mass.

The low viscosity aqueous carrier fluid functions to carry the consolidating fluid, the delayed acting catalyst and, optionally, solids into the subterranean zone. Because of the low viscosity of the aqueous carrier fluid, it rapidly dissipates into subterranean formations surrounding the zone. While a variety of aqueous fluids of low viscosity can be utilized which are characterized by high loss to subterranean formations, aqueous salt solutions are preferred. Particularly preferred aqueous salt solutions include sodium chloride solutions, e.g., 15% sodium chloride by weight, potassium and ammonium chloride solutions, e.g., 2-4% potassium chloride or ammonium chloride by weight, heavy brines, e.g., brines containing high concentrations of calcium chloride and calcium bromide, naturally occurring oil field brines and sea water. The viscosity of the aqueous carrier fluid utilized is preferably in the range of from about 1 to about 3 centipoises.

Consolidating fluids including various acid curable resins which are substantially immiscible with the aqueous carrier fluid can be utilized. Examples of such acid curable resins are furan resins, phenol-formaldehyde resins and urea-formaldehyde resins. Of these, furan resins are particularly suitable. The term "furan resins" is used herein to mean condensation resin products derived from furfural or furfuryl alcohol such as furfural-phenol resins, furfuryl alcohol resins, furfural-acetone resins, furfuryl alcohol-formaldehyde resins, and the like. The most preferred acid curable furan resin for use in accordance with the present invention is a furfuryl alcohol resin having a viscosity in the range of from about 300 to about 400 centipoises at 80° F. and an average molecular weight of about 225. Such a furfuryl alcohol resin is manufactured by the Oxccidental Chemical Company of North Tonawanda, N.Y., under the trade designation DUREZ 21687.

In preferred embodiments of the present invention, the consolidating fluid utilized is comprised of one of the acid curable resins described above combined with a diluent additive selected from the group consisting of tetrahydrofurfuryl methacrylate, tetrahydrofurfuryl acrylate, esters of phthalic acid and furfural. Such resin diluent additives impart a variety of desirable properties to the acid curable resin including lowering the viscosity of the resin, improving the dispersability of the resin in the aqueous carrier, reducing the solubility of the resin in the aqueous carrier, improving the coating of solids by the resin, providing some delay in the reaction of catalysts with the resin, improving the compressive strength of solids consolidated with the resin and allowing the resin to be utilized in low salinity carriers such as 2% by weight aqueous solutions of potassium chloride or ammonium chloride.

The consolidating fluid containing an acid curable resin can include a resin diluent additive of the type described above in amounts up to about 50% by volume of the consolidating fluid, preferably in an amount in the range of from about 15 to about 30% by volume. The most preferred resin diluent additive for use in accordance with the present invention is tetrahydrofurfuryl methacrylate.

The consolidating fluid also preferably includes a coupling agent to promote strong resin-to-sand bonding such as an organosilicon compound. A preferred such compound is N-beta-(aminoethyl)-gamma-aminopropyltrimethoxy silane.

The most preferred consolidating fluid for use in accordance with the present invention is comprised of furfuryl alcohol resin in an amount of about 40 parts by volume, tetrahydrofurfuryl methacrylate in an amount of about 10 parts by volume and N-beta-(aminoethyl)-gamma-aminopropyltrimethyoxy silane in an amount of about 0.5 parts by volume.

The delayed acting catalysts utilized in accordance with the present invention are the reaction products of an acid and an alkali metal or ammonium molybdate. When an alkali metal or ammonium molybdate is reacted in an aqueous solution with certain acids, a water soluble anionic complex results. Such a complex functions in an aqueous media as a delayed acting acid catalyst for the acid curable consolidating fluids described above. That is, the acid-molybdate complex can be dissolved in an aqueous carrier fluid containing a dispersed consolidating fluid and the mixture can be pumped for a required time period prior to when the consolidating fluid hardens. The delay is believed to be the result of the inhibition of acid ionization when the acid-molybdate complex is dissolved in an aqueous fluid. That is, the acid release from the complex is delayed, and generally, the higher the ratio of molybdate to acid in the complex, the longer the delay.

Organic acids which can be complexed with alkali metal or ammonium molybdate compounds include sulfamic acid, glycolic acid, trichloroacetic acid, formic acid and oxalic acid. The most preferred acid is sulfamic acid and the most preferred delayed acting acid catalyst for use in accordance with this invention is the reaction product of sulfamic acid and sodium molybdate.

The particular quantities of acid and molybdate compound used to form the delayed acting catalyst can vary, but generally the weight ratio of molybdate compound to acid is in the range of from about 0.5 to about 2.5 parts acid to one part molybdate compound. In preparing the catalyst, the acid and molybdate compound can be combined with a quantity of water or other aqueous solution to form a solution of desired reaction product concentration, or the acid and molybdate compound can be added directly to the aqueous carrier fluid used in either a batch or continuous manner.

While the above-described consolidating fluids are substantially immiscible in an aqueous carrier fluid, small quantities of the consolidating fluids are dissolved in the carrier fluid. It is essential that the catalyst dissolved in the carrier fluid does not catalyze the dissolved consolidating fluid component and cause the formation of consolidating fluid solids therein for an initial period of time to allow pumping and placement in a subterranean zone. The presence of consolidating fluid solids in the carrier fluid can cause permeability damage to formations into which the carrier fluid flows. The acid-molybdate complexes utilized in accordance with this invention are sufficiently delayed in reacting with the consolidating fluid to prevent the premature formation of solids in the carrier fluid, e.g., for time periods of one hour or more.

As mentioned above, the aqueous solids carrier and consolidating compositions of this invention can be prepared on-the-fly, i.e., the aqueous carrier fluid, the consolidating fluid used and the delayed acting catalyst used can be continuously combined as they are pumped into a well bore and subterranean zone penetrated by the well bore. If solids are placed in the subterranean zone, the solids can also be combined on-the-fly utilizing conventional equipment.

When solids are contacted by the consolidating fluid, either when they are combined with the aqueous carrier fluid containing consolidating fluid or when the aqueous carrier fluid containing consolidating fluid contacts solids in the subterranean zone, the solids are coated with the consolidating fluid. The dissolved delayed acting catalyst in the aqueous carrier fluid catalyzes the consolidating fluid after placement in the subterranean zone whereby it hardens and forms the coated solids into a hard permeable mass. The hard permeable mass of solids prevents or minimizes the flow of loose solids therethrough.

The particular quantities of consolidating fluid and delayed acting catalyst utilized in the aqueous carrier fluid varies in accordance with the quantity of solids to be consolidated and other factors. Generally, however, consolidating fluid is utilized in an amount in the range of from about 0.01 to about 0.04 gallon per pound of solids to be consolidated and catalyst dissolved in the carrier is utilized in an amount in the range of from about 0.05 to about 0.5 pound per pound of consolidating fluid.

An aqueous solids carrier and consolidating composition of this invention is comprised of a low viscosity aqueous carrier liquid, an acid curable resin consolidating fluid dispersed in said carrier liquid and a delayed acting consolidating fluid catalyst dissolved in said carrier liquid consisting of the reaction product of an acid and an alkali metal or ammonium molybdate. The most preferred such composition includes a low viscosity aqueous carrier liquid, a consolidating fluid comprised of a furan resin diluted with tetrahydrofurfuryl methacrylate and containing N-beta-(aminoethyl)-gamma-aminopropyltrimethoxy silane coupling agent present in the composition in an amount in the range of from about 0.5 to about 1% by weight of the composition, and a delayed acting catalyst comprised of the reaction product of sulfamic acid and sodium molybdate present in the composition in an amount in the range of from about 0.5 to about 3% parts by weight per 100 parts by volume of carrier liquid.

In placing a permeable mass of consolidated solids in a subterranean zone penetrated by a well bore in accordance with the present invention, the solids to be placed in the zone, a solids consolidating fluid of the type described above and a delayed acting catalyst comprised of the reaction product of an acid and an alkali metal or ammonium molybdate are dissolved in a low viscosity aqueous carrier fluid. The resulting composition containing the solids, consolidating fluid and catalyst is then pumped into the zone by way of the well bore whereby consolidating fluid coated solids are placed in the zone, a major portion of the aqueous composition is dissipated into surrounding earth formations and the catalyst in the aqueous composition remaining in contact with the coated solids catalyzes the consolidating fluid whereby the solids are formed into a hard permeable mass.

A variety of conventional solids can be utilized such as sand, glass beads, bauxite particles, etc. However, a preferred lightweight solid for use in accordance with this invention is walnut shells. Because walnut shells are lightweight, a relatively high concentration of such solids (up to about 4.172 pounds per gallon) can be transported by the low viscosity aqueous carrier fluid (1–3 centipoises).

As mentioned above, the methods and compositions of this invention can be utilized for consolidating solids existing in subterranean zones as well as for placing and consolidating solids in such zones. When solids are placed in a zone, they as well as solids existing in the zone which are contacted by the consolidating fluid will be consolidated into hard permeable masses.

In order to further illustrate the present invention and facilitate a clear understanding thereof, the following examples are given.

EXAMPLE 1

A consolidating fluid comprised of 40:10:0.5 parts by volume respectively of furfuryl alcohol resin, tetrahydrofurfuryl methacrylate and N-beta-(aminoethyl)-gamma-aminopropyltrimethoxy silane is prepared. Portions of the consolidating fluid and 18-40 U.S. mesh walnut shells at concentrations of 4.172 lbs/gal. are combined with 15% by weight aqueous sodium chloride solutions having sulfamic acid or various sulfamic acid-sodium molybdate reaction products dissolved therein.

The resultant aqueous walnut shell carrier and consolidating compositions are each subjected to tests simulating pumping the compositions into a subterranean zone. That is, each test slurry is continuously stirred while the temperature of the slurry is increased at a rate simulating the heat-up which would occur during downhole pumping in a well bore with the maximum temperature simulating the temperature of a subterranean zone to be consolidated. At the end of such simulated pumping tests of one hour duration, the walnut shells are separated from the liquid compositions and tamped into glass columns. The glass columns with walnut shells therein are then filled with portions of the liquid compositions so that the liquid compositions are present in voids between the walnut shells. The packed resin-coated walnut shell columns are placed in heated water baths and allowed to cure. After curing, the columns are removed from the water baths and cooled to 72° F. The glass enclosures are broken away from the consolidated walnut shell columns and 72° F. compressive strength measurements are made on portions of the columns. The results of these tests are shown in Table I below.

TABLE I

Consolidation Data Using a 15% by Weight Aqueous NaCl Solution[1]
Carrier Containing 4.172 lbs 18–40 U.S. Mesh Walnut Shells/Gal Carrier

| | Pump Test | | Consolidating Fluid/Shell Ratio (cc/g) | Aqueous Carrier-Catalyst Composition 15% NaCl/Sulfamic Acid/Sodium Molybdate cc/g/g | Comments On Carrier Composition After Pump Tests | Consolidation[2] Curing Data | | Consolidation-72° F. |
|---|---|---|---|---|---|---|---|---|
| Test No. | Max. Temp. °F. | Time, Hrs. | | | | Temp., °F. | Time, Hrs. | Compressive Strength, psi |
| 1 | 105 | 1 | 38/150 | 300/5.0/3.0 pH 0.9 | Translucent - bluish green; no undissolved solids; pH 2.3 | 140 | 24 | 896 |
| 2 | 105 | 1 | 38/150 | 300/5.0/0.0 pH 0.5 | Very turbid - undissolved solids in carrier sufficient | 140 | 24 | 292 |

TABLE I-continued

Consolidation Data Using a 15% by Weight Aqueous NaCl Solution[1]
Carrier Containing 4.172 lbs 18–40 U.S. Mesh Walnut Shells/Gal Carrier

| Test No. | Pump Test Max. Temp. °F. | Pump Test Time, Hrs. | Consolidating Fluid/Shell Ratio (cc/g) | Aqueous Carrier-Catalyst Composition 15% NaCl/Sulfamic Acid/Sodium Molybdate cc/g/g | Comments On Carrier Composition After Pump Tests | Consolidation[2] Curing Data Temp., °F. | Consolidation[2] Curing Data Time, Hrs. | Consolidation-72° F. Compressive Strength, psi |
|---|---|---|---|---|---|---|---|---|
| 3 | 135 | 1 | 38/150 | 300/4.8 5.7 pH 1.4 | to cause formation plugging pH 1.4 For the most part translucent - maybe a few undissolved solids, however, easily filtered through no. 5 Whatman filter paper without plugging; pH 2.4 | 200 | 21.25 | 1170 |
| 4 | 135 | 1 | 38/150 | 300/3.6/3.95 pH 1.5 | Translucent - no undissolved solids pH 2.6 | 200 | 21.25 | 800 |

[1]Carrier viscosity is 1.25 centipoises
[2]All consolidations are observed to be permeable hard masses From Table I it can be seen that when sulfamic acid alone is used in the carrier, premature curing of the consolidating fluid takes place whereby suspended cured consolidating fluid solids are formed in the carrier and a low compressive strength consolidation results. The reaction product of sulfamic acid and sodium molybdate in the carrier retards the catalyzation of the consolidating fluid to the extent that the portion of the consolidating fluid dissolved in the carrier is not cured and remains in solution during pumping and good compressive strength solid consolidations are obtained.

EXAMPLE 2

The procedure described in Example 1 is repeated using walnut shells at a concentration of 2.08 lbs. per gallon of carrier composition and various sulfamic acid-sodium molybdate catalysts. The results of these tests are given in Table II below.

TABLE II

Consolidation Data Using a 15% by Weight Aqueous NaCl Solution[1]
Carrier Containing 2.086 lbs 18–40 U.S. Mesh Walnut Shells/Gal Carrier

| Test No. | Pump Test Max. Temp. °F. | Pump Test Time, Hrs. | Resin/Shell Ratio (cc/g) | Aqueous Carrier-Catalyst Composition 15% NaCl/Sulfamic Acid/Sodium Molybdate cc/g/g | Comments On Carrier Composition After Pump Tests | Consolidation[2] Curing Data Temp., °F. | Consolidation[2] Curing Data Time, Hrs. | Consolidation-72° F. Compressive Strength, psi |
|---|---|---|---|---|---|---|---|---|
| 1 | 105 | 1 | 19/75 | 300/2/1.5 pH 1.9 | Translucent - bluish-green in color; no undissolved solids pH 2.3 | 140 | 24 | 350 |
| 2 | 105 | 1 | 19/75 | 300/2/1.5 pH 1.9 | Translucent - bluish-green in color; no undissolved solids pH 2.3 | 140 | 76 | 520 |
| 3 | 105 | 1 | 19/75 | 300/2.5 2.0 pH 1.4 | Translucent - bluish-green in color; no undissolved solids, pH not determined | 140 | 24 | 310 |
| 4 | 105 | 1 | 19/75 | 300/2.5/2.0 pH 1.4 | Translucent - bluish-green in color; no undissolved solids pH not determined | 140 | 96 | 548 |
| 5 | 105 | 1 | 19/75 | 300/3.0/1.5 | Translucent - bluish-green in color; no undissolved solids pH 1.3 | 140 | 24 | 322 |
| 6 | 105 | 1 | 19/75 | 300/3.0 2.0 pH 1 | Translucent - bluish-green in color; no undissolved solids pH 1.6 | 140 | 24 | 300 |
| 7 | 105 | 1 | 19/75 | 300/2.0/2.0 pH 1.6 | Translucent - bluish-green in color, no undissolved solids | 140 | 24 | 272 |

TABLE II-continued
Consolidation Data Using a 15% by Weight Aqueous NaCl Solution[1]
Carrier Containing 2.086 lbs 18–40 U.S. Mesh Walnut Shells/Gal Carrier

| | Pump Test | | | Aqueous Carrier-Catalyst Composition 15% | | Consolidation[2] | | Consolidation-72° F. |
| | Max. | | | NaCl/Sulfamic | Comments On | Curing Data | | |
| Test No. | Temp. °F. | Time, Hrs. | Resin/Shell Ratio (cc/g) | Acid/Sodium Molybdate cc/g/g | Carrier Composition After Pump Tests | Temp., °F. | Time, Hrs. | Compressive Strength, psi |
|---|---|---|---|---|---|---|---|---|
| 8 | 105 | 1 | 19/75 | 300/1.5/2.0 pH 2.0 | pH 2.6 Translucent - bluish-green in color; no undissolved solids | 140 | 24 | 112[3] |
| 9 | 135 | 1 | 19/75 | 300/1.5/2.0 pH 2.0 | pH 3.1 Translucent - bluish-green in color; no undissolved solids | 140 | 72 | 620 |
| 10 | 135 | 1 | 22.5/75 | 300/1.5/2.25 pH 3.1 | pH 3.7 Translucent - bluish-green in color; no undissolved solids | 140 | 72 | 624 |
| 11 | 135 | 1 | 22.5/75 | 300/2.4/2.7 pH 1.3 | pH 3.7 Translucent - bluish-green in color; no undissolved solids | 200 | 40 | 680 |
| 12 | 135 | 1 | 19/75 | 300/2.4 0.0 pH 0.6 | pH 2.75 Very turbid-contained suspended finely divided undissolved solids which can damage formation permeability if injected thereinto | 200 | 40 | 120 |
| 13 | 85 | 1 | 19/75 | 300/6.0/0.0 pH 0.4 | pH 1.7 Translucent; no undissolved solids; pH not obtained | 105 | 68 | 440[3] |
| 14 | 85 | 1 | 19/75 | 300/6.0/0.0 pH 0.4 | Translucent- no undissolved solids; pH not obtained | 72 | 68 | 300[3] |
| 15 | 85 | 1 | 19/75 | 300/6.0 3.0 pH 1.0 | Translucent- no undissolved solids; pH not obtained | 105 | 68 | 560[3] |
| 16 | 85 | 1 | 19/75 | 300/6.0/3.0 pH 1.0 | Translucent- no undissolved solids; pH not obtained | 72 | 68 | 260[3] |

[1]Carrier viscosity is 1.25 centipoises
[2]All consolidations are observed to be hard permeable masses
[3]Not fully cured based on brownish appearance; usually blackish in color if cured From Table II it can be seen that the present invention allows adequate pump time and results in good consolidations being formed at pumping temperatures ranging from 85° F. to 135° F. and at cure temperatures as low as 72° F.

EXAMPLE 3

The procedure described in Example 1 above is repeated using 2% aqueous potassium chloride and 2% aqueous ammonium chloride solution carriers containing 2.086 pounds of 18–40 U.S. mesh walnut shells per gallon of carrier. The results of these tests are shown in Table III below.

TABLE III
Consolidation Data Using 2% by Weight Aqueous KCl and 2% by Weight Aqueous NH₄Cl Solution[1] Containing 2.086 lbs 18–40 U.S. Mesh Walnut Shells/Gal Carrier

| | Pump Test | | | Aqueous Carrier-Catalyst Composition | | Consolidation[2] | | Consolidation-72° F. |
| | Max. | | Consolidating | Brine/Sulfamic | Comments On | Curing Data | | |
| Test No. | Temp. °F. | Time, Hrs. | Fluid/Shell Ratio (cc/g) | Acid/Sodium Molybdate cc/g/g | Carrier Composition After Pump Tests | Temp., °F. | Time, Hrs. | Compressive Strength, psi |
|---|---|---|---|---|---|---|---|---|
| 1 | 135 | 1 | 19/75 | 2% KCl | Translucent - | 200 | 40 | 444 |

TABLE III-continued

Consolidation Data Using 2% by Weight Aqueous KCl and 2% by Weight Aqueous NH$_4$Cl Solution[1] Containing 2.086 lbs 18-40 U.S. Mesh Walnut Shells/Gal Carrier

| Test No. | Pump Test Max. Temp. °F. | Pump Test Time, Hrs. | Consolidating Fluid/Shell Ratio (cc/g) | Aqueous Carrier-Catalyst Composition Brine/Sulfamic Acid/Sodium Molybdate cc/g/g | Comments On Carrier Composition After Pump Tests | Consolidation[2] Curing Data Temp., °F. | Consolidation[2] Curing Data Time, Hrs. | Consolidation-72° F. Compressive Strength, psi |
|---|---|---|---|---|---|---|---|---|
|  |  |  |  | (300)/2.4/2.7 pH 2.0 | bluish-green; no undissolved solids pH 3.1 |  |  |  |
| 2 | 135 | 1 | 19/75 | 2% NH$_4$Cl (300)/2.4/2.7 pH 1.9 | Translucent - bluish-green; no undissolved solids pH 2.6 | 200 | 40 | 436 |

[1] Each carrier has a viscosity of 1.04 centipoises
[2] Each consolidation is observed to be a permeable hard mass

EXAMPLE 4

The procedure in Example 1 is repeated using various quantities of 35-60 U.S. mesh walnut shells and various catalysts. The results of these tests are given in Table IV below.

TABLE IV

Consolidation Data Using a 15% by Weight Aqueous NaCl Solution[1] Carrier Containing 35-60 U.S. Mesh Walnut Shells/Gal Carrier

| Test No. | Pump Test Max. Temp. °F. | Pump Test Time, Hrs. | Walnut Shell Conc. in Carrier lbs/gal | Consolidating Fluid/Shell Ratio (cc/g) | Aqueous Carrier-Catalyst Composition 15% NaCl/Sulfamic Acid/Sodium Molybdate cc/g/g | Comments On Carrier Composition After Pump Tests | Consolidation[6] Curing Data Temp., °F. | Consolidation[6] Curing Data Time, Hrs. | Consolidation-72° F. Compressive Strength psi |
|---|---|---|---|---|---|---|---|---|---|
| 1 | 105 | 1 | 2.086[2] | 19/75 | 300/2.5/0.0 pH 0.4 | Turbid - some undissolved solids sufficient to cause some formation plugging | 140 | 72 | 520 |
| 2 | 105 | 1 | 2.086[2] | 19/75 | 300/2.5/2.0 pH 1.4 | Translucent - no undissolved solids; bluish-green in color | 140 | 72 | 728 |
| 3 | 135 | 1 | 2.086[2] | 19/75 | 300/1.5/2.25 pH 3.1 | Translucent - no undissolved solids; bluish-green in color; pH 3.25 | 200 | 90 | 588[4] |
| 4 | 135 | 1 | 4.172[3] | 38/150 | 300/2.4/2.7 pH 1.3 | Translucent - no undissolved solids; bluish-green in color pH 2.7 | 200 | 18 | 853 |
| 5 | 135 | 1 | 4.172[3] | 38/150 | 300/3.6/3.95 pH not taken | Translucent - no undissolved solids; bluish-green in color; pH not taken | 200 | 69 | 210[5] |
| 6 | 135 | 1 | 4.172[3] | 38/150 | 300/4.26/4.67 pH not taken | Translucent - no undissolved solids; bluish-green in color; pH not taken | 200 | 69 | 175[5] |

[1] Carrier viscosity is 1.26 centipoises
[2] Equivalent in bulk volume to placing 5.38 lbs 20-40 U.S. mesh sand/gal. carrier
[3] Equivalent in bulk volume to placing 10.76 lbs 20-40 U.S. mesh sand/gal carrier
[4] Appeared not fully cured - brownish rather than blackish in color
[5] Appeared crumbly - too much catalyst used
[6] All consolidations appeared permeable

What is claimed is:

1. A method of consolidating solids in a subterranean zone comprising contacting said solids with a low viscosity aqueous carrier fluid having a consolidating fluid comprised of an acid curable resin dispersed therein and a delayed acting acid catalyst for said resin dissolved therein, whereby said solids are coated by said consolidating fluid, said consolidating fluid is catalyzed by said catalyst and said solids are consolidated into a hard permeable mass, said delayed acting acid catalyst being comprised of the reaction product of an acid and an alkali metal or ammonium molybdate.

2. The method of claim 1 wherein said acid is selected from the group consisting of sulfamic acid, glycolic acid, trichloroacetic acid, formic acid and oxalic acid.

3. The method of claim 1 wherein said delayed acting acid catalyst is the reaction product of sulfamic acid and sodium molybdate.

4. The method of claim 1 wherein said acid curable resin is selected from the group consisting of furan resins, phenol-formaldehyde resins and urea-formaldehyde resins.

5. The method of claim 4 wherein said low viscosity aqueous carrier fluid is an aqueous salt solution.

6. The method of claim 5 wherein said aqueous salt solution is selected from the group consisting of sodium chloride solutions, potassium chloride solutions, ammonium chloride solutions, calcium chloride-calcium bromide solutions, oil field brines and sea water.

7. The method of claim 4 wherein said consolidating fluid is further characterized to include a resin diluent additive selected from the group consisting of tetrahydrofurfuryl methacrylate, tetrahydrofurfuryl acrylate, esters of phthalic acid and furfural.

8. The method of claim 1 wherein said consolidating fluid is a mixture of a furan resin and tetrahydrofurfuryl methacrylate.

9. The method of claim 8 wherein said delayed acting catalyst is the reaction product of sulfamic acid and sodium molybdate.

10. A method of placing a permeable mass of consolidated solids in a subterranean zone penetrated by a well bore comprising the steps of:

combining solids, a solids consolidating fluid and a delayed acting catalyst for said consolidating fluid with a low viscosity aqueous carrier fluid, said consolidating fluid being comprised of an acid curable resin and a diluent additive therefor and said delayed acting catalyst being comprised of the reaction product of an acid and an alkali metal or ammonium molybdate; and pumping said carrier fluid containing said solids, consolidating fluid and delayed acting catalyst into said zone whereby said solids are coated with said consolidating fluid, the coated solids are deposited in a mass in said zone and said consolidating fluid is catalyzed by said catalyst.

11. The method of claim 10 wherein said acid is selected from the group consisting of sulfamic acid, glycolic acid, trichloroacetic acid, formic acid and oxalic acid.

12. The method of claim 10 wherein said delayed acting catalyst is the reaction product of sulfamic acid and sodium molybdate.

13. The method of claim 10 wherein said acid curable resin is selected from the group consisting of furan resins, phenol-formaldehyde resins and urea-formaldehyde resins.

14. The method of claim 13 wherein said diluent additive is selected from the group consisting of tetrahydrofurfuryl methacrylate, tetrahydrofurfuryl acrylate, esters of phthalic acid and furfural.

15. The method of claim 10 wherein said acid curable resin is a mixture of a furan resin and tetrahydrofurfuryl methacrylate.

16. The method of claim 15 wherein said delayed acting catalyst is the reaction product of sulfamic acid sodium molybdate.

17. The method of claim 10 wherein said solids are walnut shells.

* * * * *